United States Patent
Lee et al.

(10) Patent No.: US 7,821,945 B2
(45) Date of Patent: Oct. 26, 2010

(54) METHOD OF DOWNLOADING DATA IN PEER-TO-PEER SERVICE OF WIRED AND WIRELESS INTEGRATED NETWORK AND NODE THEREFOR

(75) Inventors: Kyung-geun Lee, Yongin-si (KR); Len Quan, Seoul (KR)

(73) Assignees: Sejong Industry-Academy Cooperation Foundation, Seoul (KR); Samsung Electronics Co., Ltd., Suwon-Si (KR)

(*) Notice: Subject to any disclaimer, the term of this patent is extended or adjusted under 35 U.S.C. 154(b) by 1402 days.

(21) Appl. No.: 11/256,162

(22) Filed: Oct. 24, 2005

(65) Prior Publication Data

US 2006/0153082 A1   Jul. 13, 2006

(30) Foreign Application Priority Data

Jan. 8, 2005   (KR) .................. 10-2005-0001954

(51) Int. Cl.
   *G01R 31/08* (2006.01)
(52) U.S. Cl. ............... 370/238; 370/254; 709/220; 709/249
(58) Field of Classification Search .......... 370/238, 370/254; 709/220, 249
See application file for complete search history.

(56) References Cited

U.S. PATENT DOCUMENTS

| | | | |
|---|---|---|---|
| 6,549,786 B2* | 4/2003 | Cheung et al. | 455/524 |
| 7,242,923 B2* | 7/2007 | Perera et al. | 455/411 |
| 7,260,383 B1* | 8/2007 | Ngan | 455/412.1 |
| 2004/0111469 A1 | 6/2004 | Manion et al. | |
| 2004/0162871 A1 | 8/2004 | Pabla et al. | |
| 2005/0120133 A1* | 6/2005 | Slack-Smith | 709/234 |
| 2006/0153200 A1* | 7/2006 | Filsfils et al. | 370/395.31 |

FOREIGN PATENT DOCUMENTS

| | | |
|---|---|---|
| JP | 2004-5491 | 1/2004 |
| JP | 2004-127074 | 4/2004 |
| JP | 2004-157826 | 6/2004 |
| JP | 2004-213508 | 7/2004 |
| KR | 1996-0006394 | 2/1996 |
| KR | 2001-78821 | 8/2001 |
| KR | 2001-0079045 | 8/2001 |
| KR | 2003-43080 | 6/2003 |
| KR | 10-397673 | 8/2003 |
| KR | 2004-94245 | 11/2004 |

OTHER PUBLICATIONS

Office Action issued in Korean Patent Application No. 2005-1954 on Sep. 21, 2006.

* cited by examiner

*Primary Examiner*—Huy D Vu
*Assistant Examiner*—Kibrom T Hailu
(74) *Attorney, Agent, or Firm*—Staas & Halsey LLP (57) ABSTRACT

A method of downloading data in a peer-to-peer service on a wired and wireless integrated network and a node therefore includes downloading the data to a requester node only through wired nodes among a plurality of nodes located in a download path between the requester node which requests the data and a holder node which has the data. Thereby, the file download rate can be improved, without reducing the retrieval success ratio according to the peer-to-peer method, and the storage space for the data of each node can be saved.

24 Claims, 7 Drawing Sheets

METHOD OF DOWNLOADING DATA IN PEER-TO-PEER SERVICE OF WIRED AND WIRELESS INTEGRATED NETWORK AND NODE THEREFOR

CROSS-REFERENCE TO RELATED APPLICATIONS

This application claims the benefit of Korean Patent Application No. 2005-1954, filed on Jan. 8, 2005 in the Korean Intellectual Property Office, the disclosure of which is incorporated herein in its entirety by reference.

BACKGROUND OF THE INVENTION

1. Field of the Invention

Aspects of the present invention relate to data downloads on a network, and more particularly, to a method of downloading data in a peer-to-peer service on wired and wireless integrated networks, and a node therefor.

2. Description of the Related Art

Recently, a peer-to-peer method has been widely used for exchanging information on the internet. The peer-to-peer method shares files possessed by nodes which participate in the peer-to-peer network. Various methods for sharing and retrieving files according to the peer-to-peer method include: broadcasting a retrieval message to every peripheral node; retrieving the file with the identification key for the shared file; and forming topology, sharing the topology and data information and retrieving the file.

Figure 1:
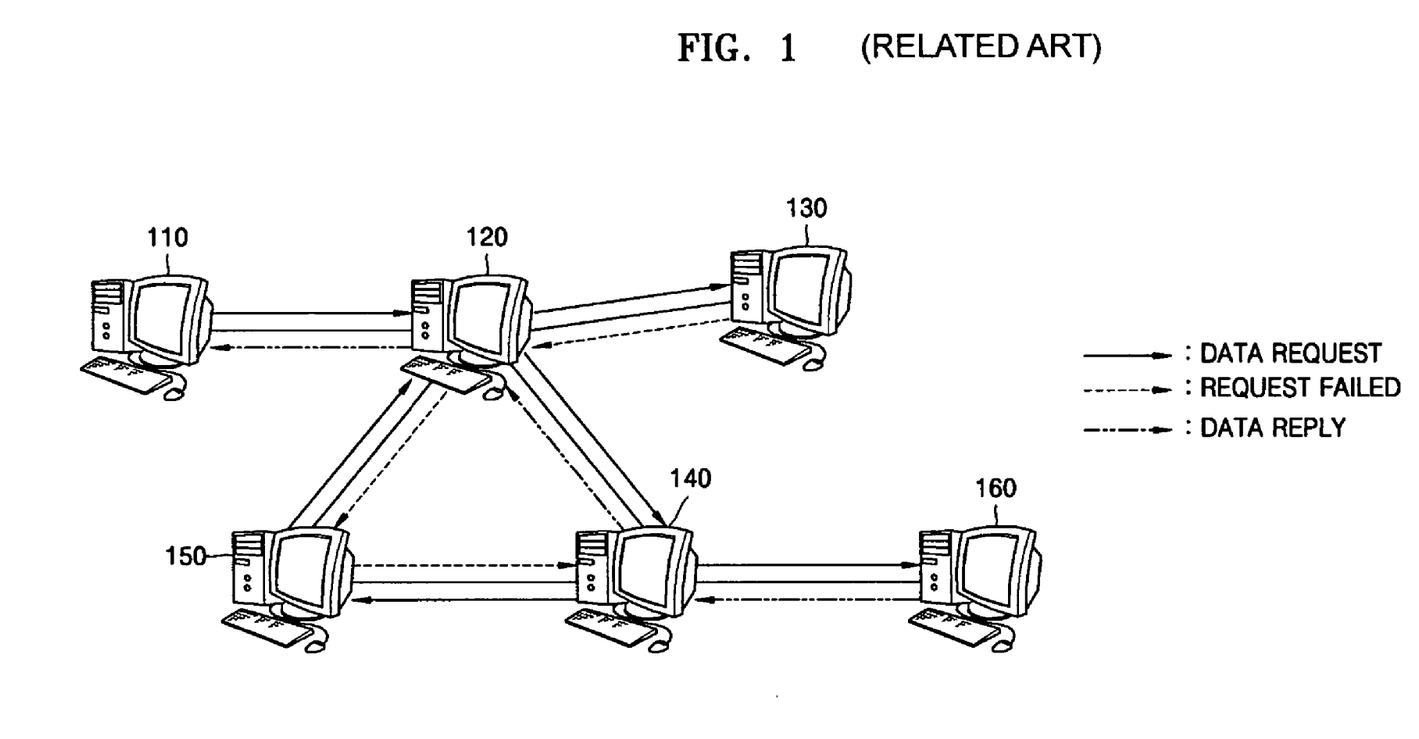
FIG. 1 illustrates a conventional procedure of retrieving and downloading a file in a peer-to-peer service.

FIG. 1 illustrates a conventional procedure of retrieving and downloading a file shared by a node of the peer-to-peer network. Nodes 110 through 160 have routing tables for caching only the information on the file and a local file storage in which the shared file is stored. The routing table has an identification key for identifying each node and the information on the node having the file and a next node accessible to the node.

The requester node 110 which wants to retrieve and download a specific file sends a retrieval message to the node A 120 which has the key value closest to the key value of the file to be retrieved in its own routing table. The node A 120 checks whether the requested file exists in its own local file storage, and if not, sends the retrieval message to the node B 130 which has the key value closest to the key value of the requested file in the file information cached in node A's own routing table.

The node B 130 checks whether the file exists in its own local storage, and if not, sends a retrieval failure message to the node A 120 by a backtracking method. If the node which transmits the retrieval message in the retrieval direction does not exist or a loop is generated, the retrieval is always performed using the backtracking method such as that described with respect to the node B 130.

After receiving the retrieval failure message, the node A 120 transmits the retrieval message to the node C 140 having the key value that is the second closest to the key value of the requested file. Then, the node C 140 transmits the retrieval message to the node D 150 and the node D 150 transmits the retrieval message to the node A 120. The node A 120 can tell whether this message looping is generated through a global unique identifier (GUID) of the retrieval message. The node A 120 transmits the retrieval failure message to the node C 140 through the node D 150 in the backtracking method. The node C 140 transmits the retrieval message to the node E 160 having the key value next closest to the key value of the requested file.

The node E 160 downloads the file to the requester node 110 through the node C 140 and through the node A 120, which is the path of requesting the retrieval since the node E 160 has the file requested by the requester node 110. At this time, the node C 140 and the node A 120, which are located in the download path, store the file in their own local storages. If the local storage is filled, the oldest file is removed and the information on the file is cached in the routing table according to the least recently used (LRU) rule.

When transmitting the file, the file retrieval range is limited based on a time-to-live (TTL) value, and a hop count used in the retrieval is set using a depth-to-live value. The protocol is packet-oriented and every message has a 64-bit transaction ID, a hops-to-live limit and a depth counter which are randomly generated. There are various kinds of protocol messages, such as the message Request.data that is used when retrieving a file, the message Request.failed that is sent when the retrieval fails, and the message Send.data that is used when sending the retrieved file to the requester. The above-mentioned retrieval method has a high retrieval success ratio and generates little traffic.

The conventional method of retrieving and downloading the data on the peer-to-peer network is designed for a wired environment, and stores the file in all the nodes located in the download path when downloading the file. Accordingly, a relatively large bandwidth must be allowed in the links between nodes, and each node must have a large storage capability for storing many files.

The wired and wireless integrated network has been developed and popularized, and high-performance wireless nodes including a wireless internet function have become more common. Although the peer-to-peer service is provided through the wired and wireless integrated network, wireless nodes generally have a small storage capability and a limited bandwidth of a wireless channel. Accordingly, the conventional peer-to-peer method of downloading data based on the wired network and wired node cannot be applied to the wired and wireless integrated environment.

SUMMARY OF THE INVENTION

Aspects of the present invention provide a method of downloading data in a peer-to-peer service suitable for a wired and wireless integrated environment, and the node therefor.

Aspects of the present invention also provide a method of rapidly downloading data in the peer-to-peer service of the wired and wireless integrated environment and the node therefor, in consideration of the limited bandwidth of a wireless channel.

Aspects of the present invention also provide a method of downloading data while selectively caching the data in the peer-to-peer service of the wired and wireless integrated environment and the node therefor, in consideration of limited storage capability of the node.

Aspects of the present invention also provide a computer-readable medium having embodied thereon a computer program for the method of downloading data suitable for the wired and wireless integrated environment.

Aspects of the present invention also provide a computer-readable medium having embodied thereon a computer program for the method of rapidly downloading data in the peer-to-peer service of the wired and wireless integrated environment, in consideration of the limited bandwidth of a wireless channel.

Aspects of the present invention also provide a computer-readable medium having embodied thereon a computer program for the method of downloading data while selectively caching the data in the peer-to-peer service of the wired and wireless integrated environment, in consideration of limited storage capability of the node.

According to an aspect of the present invention, there is provided a method of downloading data in a peer-to-peer service of a wired and wireless integrated network, including: downloading the data to a requester node through only wired nodes among a plurality of nodes located in a download path between the requester node which requests the data and a holder node which has the data.

According to another aspect of the present invention, there is provided a method of downloading data using a holder node which is connected to a wired and wireless integrated peer-to-peer network and has the data requested by a requester node, including: judging whether the node next to the holder node is a wired node or a wireless node in the download path between the requester node and the holder node; if the next node is the wireless node, transmitting an information message including information on the data to the next node; receiving from the next node a response message including the address of a wired node to which the data will be transmitted; and transmitting the data to the wired node according to the response message.

According to another aspect of the present invention, there is provided a holder node which is connected to a wired and wireless integrated peer-to-peer network and has data requested by a requester node, including: a communication unit which performs communication with the other nodes connected to the peer-to-peer network; a data storing unit which stores the data requested by the requester node; and a controlling unit which judges whether the node next to the holder node is a wired node or a wireless node in the download path between the requester node and the holder node, and if the next node is the wireless node, generates an information message including information on the data and controls the communication unit to transmit it to the next node and controls the communication unit to transmit the data to a wired node according to a response message which is received from the next node and includes the address of the wired node to which the data will be transmitted.

According to another aspect of the present invention, there is provided a method of downloading data using a wireless node which is connected to a wired and wireless integrated peer-to-peer network and is located in a downloading path between a requester node and a holder node which has the data requested by the requester node, including: receiving a first information message including information on the data from a previous node; judging whether a next node is a wired node or a wireless node; and if the next node is the wired node, transmitting a first response message including the address of the next node to the previous node.

According to another aspect of the present invention, there is provided a wireless node which is connected to a wired and wireless integrated peer-to-peer network and is located in a downloading path between a requester node and a holder node which has the data requested by the requester node, including: a communication unit which receives a first information message including information on the data transmitted by a previous node through the peer-to-peer network; and a controlling unit which judges whether the next node is a wired node or a wireless node in response to the first information message, and generates a first response message including the address of the next node and controls the communication unit to transmit the first response message to the previous node, if the next node is the wired node.

According to another aspect of the present invention, there is provided a method of downloading data in a peer-to-peer service of a wired and wireless integrated network, including: downloading the data to a requester node only through first to N-th nodes (N is integer equal to at least 1) located at a predetermined interval among a plurality of nodes located in a download path between the requester node which requests the data and a holder node which has the data; and caching the data in the nodes located at the predetermined interval.

According to another aspect of the present invention, there is provided a computer-readable medium having embodied thereon a computer program for a method of downloading data in a peer-to-peer service of a wired and wireless integrated network, the method of downloading data including: downloading the data to a requester node only through wired nodes among a plurality of nodes located in a download path between the requester node which requests the data and a holder node which has the data.

According to another aspect of the present invention, there is provided a computer-readable medium having embodied thereon a computer program for a method of downloading data using a holder node which is connected to a wired and wireless integrated peer-to-peer network and has the data requested by a requester node, the method of downloading data including: judging whether the node next to the holder node is a wired node or a wireless node in the download path between the requester node and the holder node; if the next node is a wireless node, transmitting an information message including information on the data to the next node; receiving from the next node a response message including the address of the wired node to which the data will be transmitted; and transmitting the data to the wired node according to the response message.

According to another aspect of the present invention, there is provided a computer-readable medium having embodied thereon a computer program for a method of downloading data using a wireless node which is connected to a wired and wireless integrated peer-to-peer network and is located in a downloading path between a requester node and a holder node which has the data requested by the requester node, the method of downloading data including: receiving a first information message including information on the data from a previous node; judging whether the next node is a wired node or a wireless node; and if the next node is a wired node, transmitting a first response message including the address of the next node to the previous node.

According to another aspect of the present invention, there is provided a computer-readable medium having embodied thereon a computer program for a method of downloading data in a peer-to-peer service of a wired and wireless integrated network, the method of downloading data including: downloading the data to a requester node only through first to N-th nodes (N is integer at least 1) located at a predetermined interval among plural nodes located in a download path between the requester node which requests the data and a holder node which has the data; and caching the data in the nodes located at the predetermined interval.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
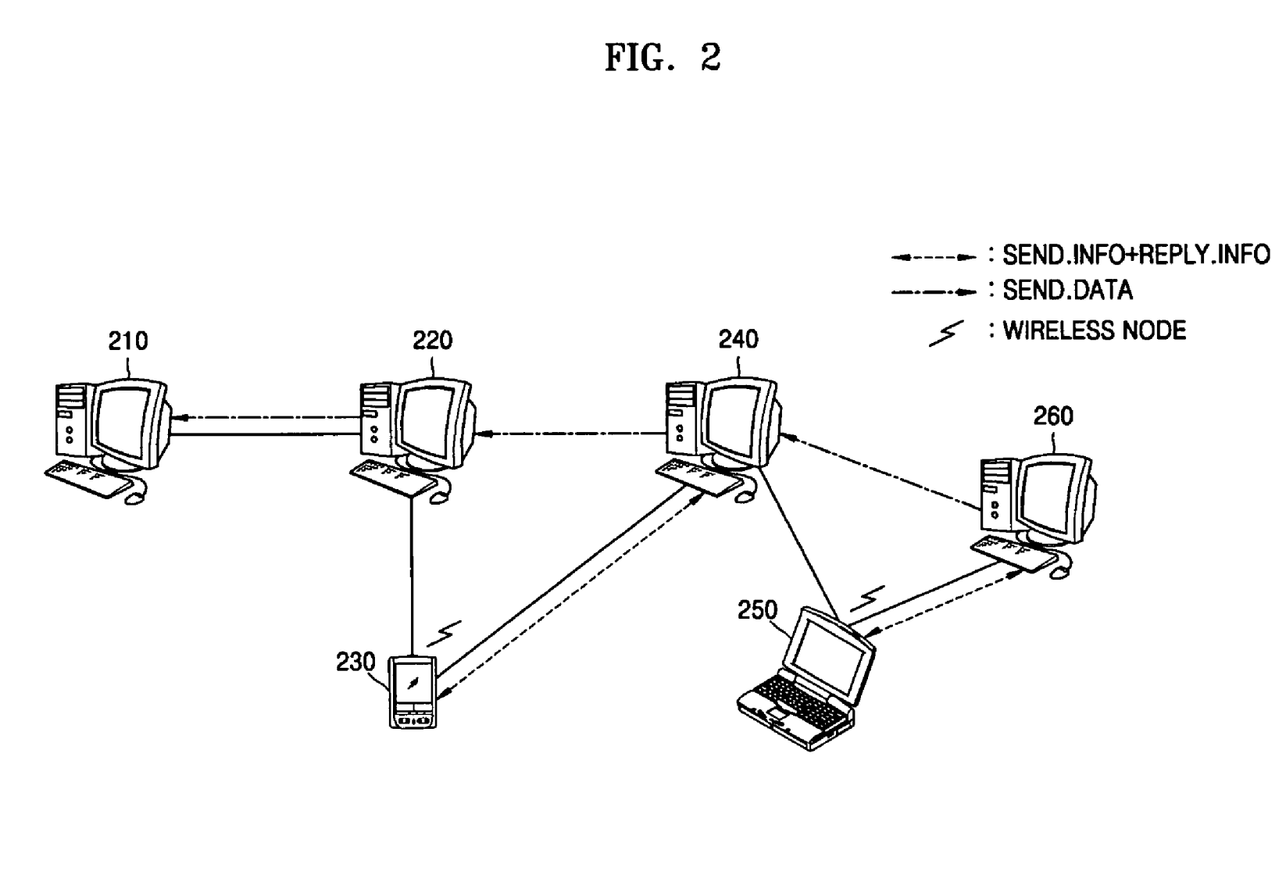
FIG. 2 illustrates a method of downloading data in the peer-to-peer service according to an embodiment of the present invention.

FIG. 2 illustrates a method of downloading data according to an embodiment of the present invention. A download path including a node 220, a node 230, a node 240 and a node 250, in this order, is formed between a requester node 210 which wants to retrieve and download a specific file and a holder node 260 having the specific file. The node 230 and the node 250 are wireless nodes and the other nodes are wired nodes.

The nodes 210 through 260 have a local file storage in which the shared file is stored and routing tables for caching only the information on the file. The routing table has an identification key for identifying each node and the information on the node having the file and the next node accessible to the node and the information on the previous node thereof.

In the present embodiment, the procedure for searching for the holder node 260 having the specific file is performed according to the conventional technique. When the holder node 260 having the file transmits the file to the file requester node 210 via the download path, if the next node in the download path is a wireless node, only the caching information is transmitted to the wireless node, without transmitting the file to the wireless node. The caching information includes information such as a key value representing the file and the address of the node in which the file is stored. The wireless node receives and caches the caching information and then transmits to the node having the file the address information of the wired node to which the file will be transmitted. Accordingly, in the present embodiment, the file requested by the requester node 210 is delivered to the requester node 210 only through the wired nodes 220 and 240 in the download path. The requested file may be cached in all the wired nodes in the download path. Also, the requested file may be selectively cached in some wired nodes or may be cached only in wired nodes located at certain intervals.

The holder node 260 knows that the node 250 next to the holder node 260 is a wireless node in the download path, by referring its own routing table. The holder node 260 transmits an information message SEND.INFO carrying the information such as the key value of the requested file and the address of the holder node 260 to the node 250, without transmitting the requested file. The node 250 caches the information included in the information message in its own routing table and then passes the information on the node 240 in a response message REPLY.INFO transmitted to the holder node 260. The holder node 260 knows that the node 240 is a wired node by reference to the routing table and transmits the requested file to the node 240, thus bypassing the wireless node 250. Similarly, the node 240 transmits the message SEND.INFO to the wireless node 230, which passes the information on the next node 220 in a response message REPLY.INFO to transmit it to the node 240. The node 240 knows that the node 220 is a wired node and transmits the requested file to the node 220. Finally, the requested file is sent to the requester node 210 through the node 220.

Here, the messages SEND.INFO and REPLY.INFO include the transaction ID, hops-to-live and depth counter information in addition to the key value of the requested file and the data source. The hops-to-live is a variable representing the number of nodes to which the message can be delivered so that the message is prevented from being infinitely transmitted. The depth counter is a variable similar to the hops-to-live and is increased by 1 whenever the message is delivered to one node. If the depth counter reaches a maximum value, the message is no longer transmitted.

The wireless nodes 230 and 250 extract the information on the requested file from the received message SEND.INFO and cache it in their own tables. The cached information includes the key value representing the file and the address of the node in which the file is stored.

Figure 3:
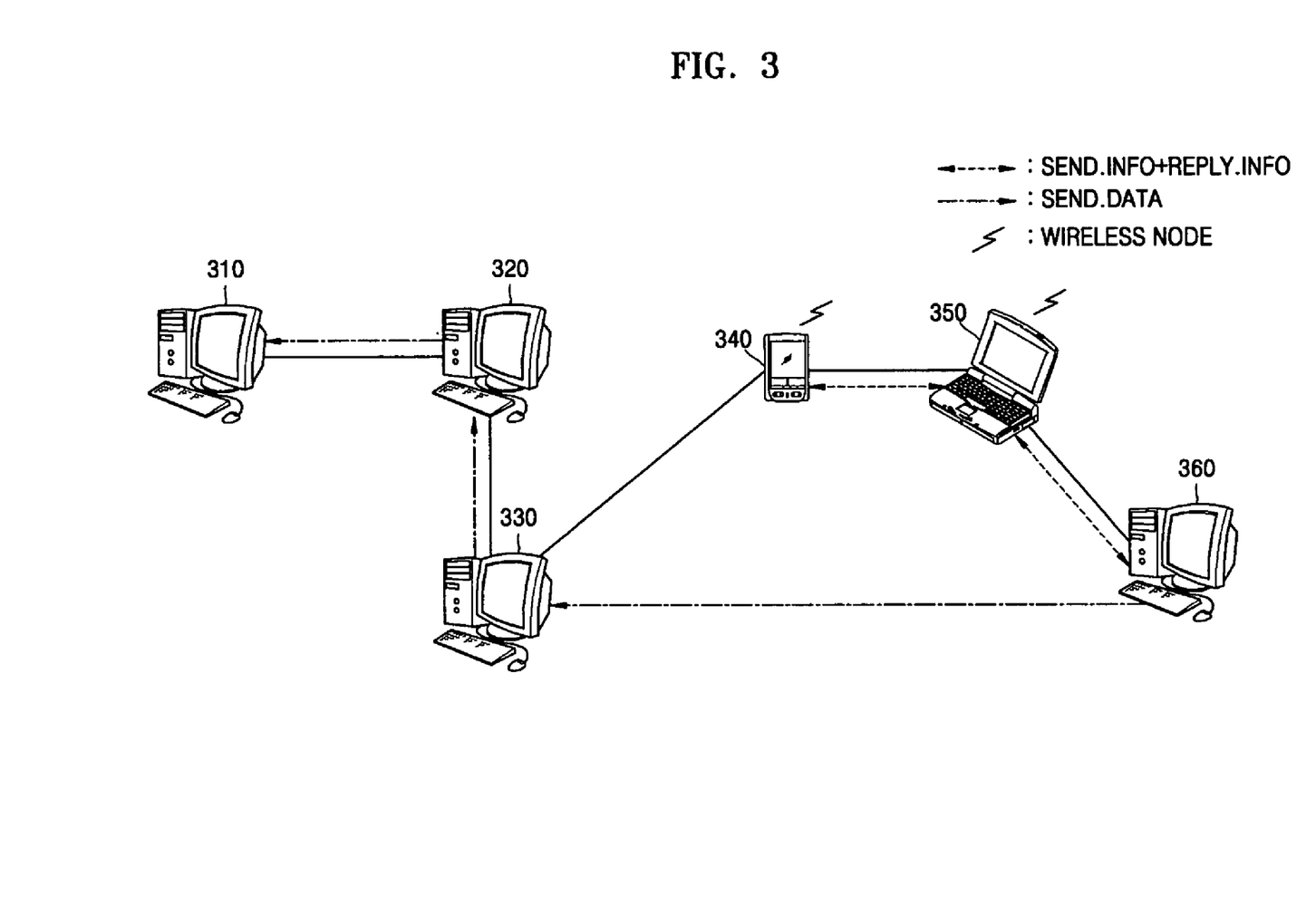
FIG. 3 illustrates a method of downloading data in the peer-to-peer service according to another embodiment of the present invention.

FIG. 3 illustrates a method of downloading data according to another embodiment of the present invention. A download path including a node 320, a node 330, a node 340 and a node 350, in this order, is formed between a requester node 310 which wants to retrieve and download a specific file and a holder node 360 having the specific file. The node 340 and the node 350 are wireless nodes and the other nodes 310, 320, 330 and 360 are wired nodes.

The wireless nodes 340 and 350 are continuously located in the download path. The holder node 360 knows that that the node 350 next to the holder node 360 in the download path is a wireless node by referring to its own routing table. The holder node 360 transmits an information message SEND.INFO to the node 350. The node 350 caches the information on the requested file included in the information message in its own routing table and then transmits the information message SEND.INFO to the node 340, because the next node 340 is a wireless node.

The node 340 caches the information on the requested file included in the information message in its own routing table. Then, the node 340 transmits a response message REPLY.INFO including the address information of the node 330 to the node 350, because it knows that the next node 330 is a wired node. The node 350 transmits the response message REPLY.INFO to the node 360. The holder node 360 extracts the address information of the node 330 from the response message REPLY. INFO and then transmits the requested file to the node 330. Finally, the requested file is sent to the requester node 310 through the node 320.

Figure 4:
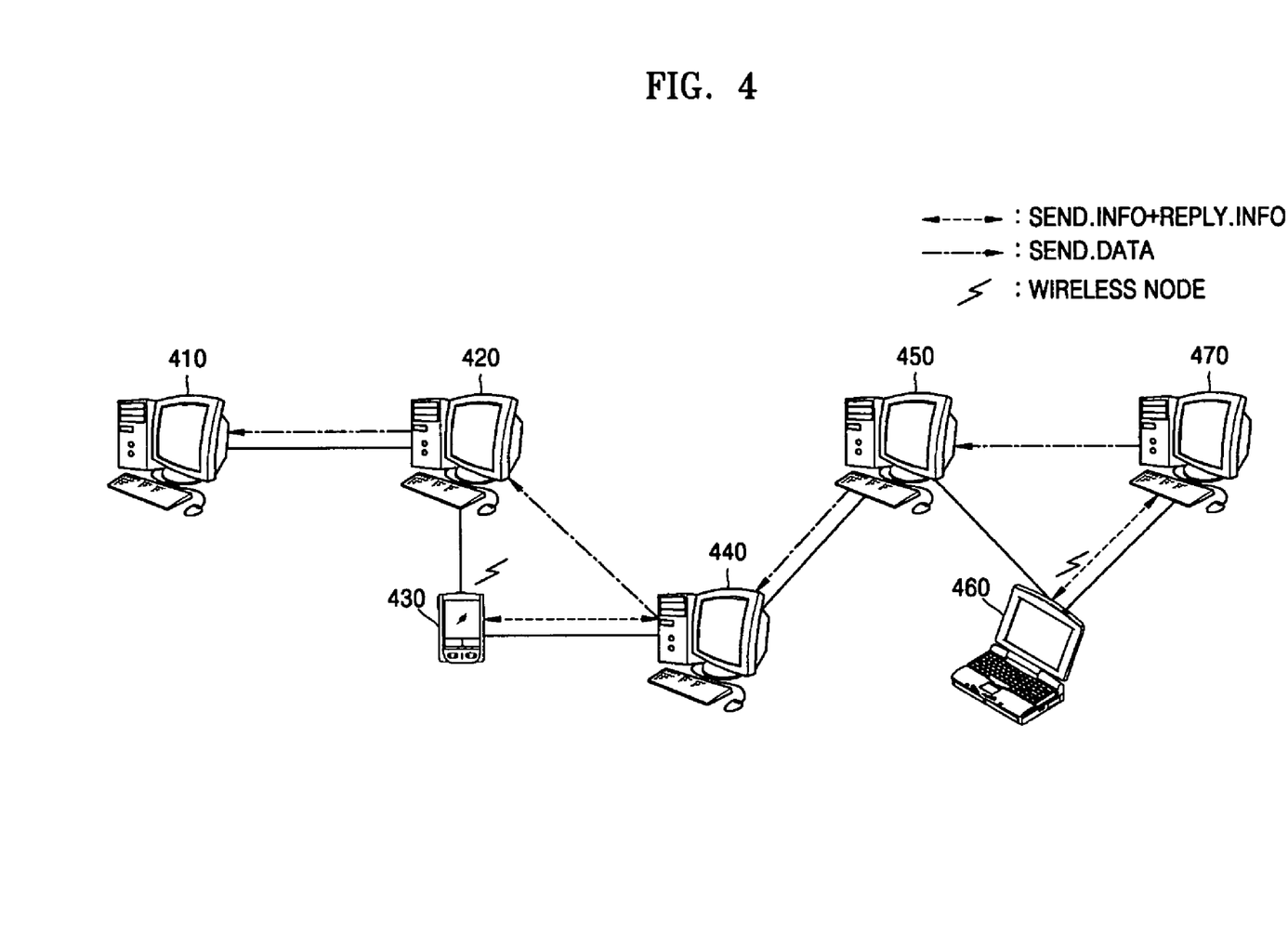
FIG. 4 illustrates a method of downloading data in the peer-to-peer service according to another embodiment of the present invention.

In the above-mentioned embodiments, the requested file was cached in all the wired nodes in the download path. However, the requested file may be selectively cached in some wired nodes or may be cached only in the wired nodes located at certain intervals. Referring to FIG. 4, the embodiment of caching the requested file in some wired nodes in the download path will be explained.

A download path including a node 420, a node 430, a node 440, a node 450 and a node 460, in this order, is formed between a requester node 410 which wants to retrieve and download a specific file and a holder node 470 having the specific file. The node 430 and the node 460 are wireless nodes, and the other nodes are wired nodes. Since the requested file is downloaded only through the wired nodes in the download path, it is delivered to the requester node 410 through the node 450, the node 440 and the node 420, respectively. In the present embodiment, the requested file is stored in every other node. That is, the requested file is not stored in the node 450 or the node 420, and is stored only in the node 440. The node 450 and the node 420 cache only the information on the requested file in their routing tables. In the present embodiment, the interval between the nodes in which the requested file is stored is 1. However, the interval may be at least two.

Figure 5:
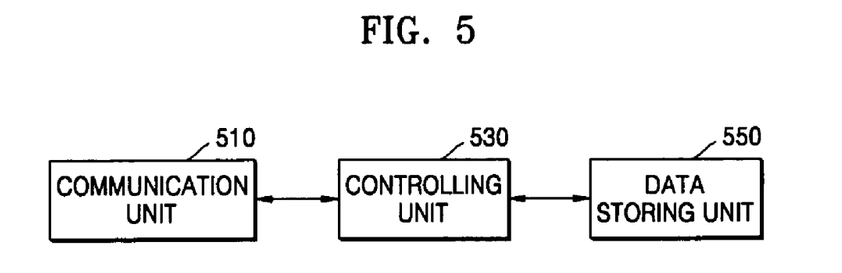
FIG. 5 is a block diagram of a node according to an embodiment of the present invention.

FIG. 5 is a block diagram of a node according to an embodiment of the present invention. The node includes a communication unit 510, a controlling unit 530 and a data storing unit 550. The communication unit 510 receives data and/or transmits data to another node through the wired and wireless integrated network, under the control of the controlling unit 530. The data storing unit 550 stores the routing table (not shown).

The controlling unit 530 performs the data downloading method according to the present invention and controls the communication unit 510 and the data storing unit 550. The node shown in FIG. 5 can be a wireless node or a wired node. The internal structure of the communication unit 510, the controlling unit 530 and the data storing unit 550 may vary depending on whether the node is a wireless node or a wired node. However, the node shown in FIG. 5 can easily be embodied by those of ordinary skill in the art.

Figure 6:
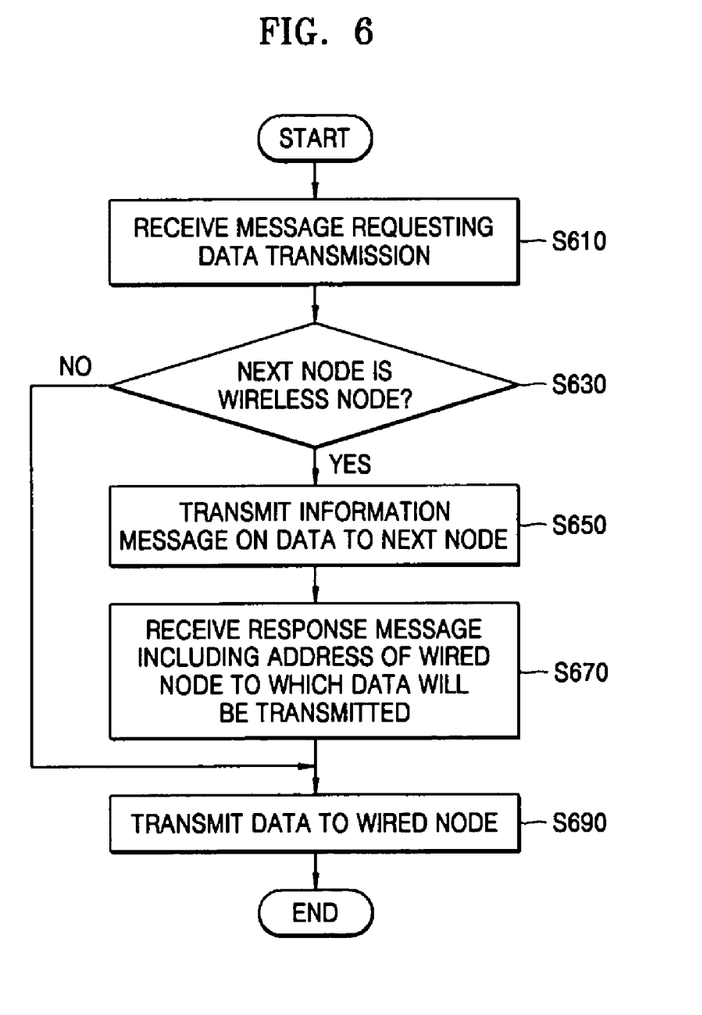
FIG. 6 is a flowchart illustrating the operation of a holder node according to an embodiment of the present invention.

Based on the structure of the node shown in FIG. 5, the operation of the holder node according to aspects of the present invention will be described with reference to FIG. 6. FIG. 6 is a flowchart illustrating the operation of a holder node according to an embodiment of the present invention. The holder node is the holder node shown in FIG. 2, 3 or 4.

The holder node receives a message requesting a predetermined data from the requester node through the communication unit 510 in the path shown in FIG. 2, 3 or 4 in operation S610. The predetermined data is a specific file which a requester node wants to download.

The controlling unit 530 which receives the message from the communication unit 510 caches the key value of the requested file and the address of the holder node included in the message in the routing table. Then, the controlling unit 530 judges whether the next node is a wired node or a wireless node by referring to the routing table in operation S630. If the next node is a wireless node, the controlling unit 530 generates the information message SEND.INFO which carries the key value of the file and the address of the holder node and other identification information, instead of the file requested by the requester node. The generated message SEND.INFO is transmitted to the next node in the download path by the communication unit 510 according to the control of the controlling unit 530 in operation S650.

The next node caches the information included in the information message SEND.INFO in its own routing table and then, if the next node in the download path is a wired node, transmits the response message REPLY.INFO including the address of the next node to the holder node. However, as shown in FIG. 3, if the node 340 located next to the next node 350 is also a wireless node, the node 350 transmits the message SEND.INFO to the node 340 and then receives the message REPLY.INFO including the address of the wired node 330 from the node 340. Then, the node 350 transmits the message REPLY.INFO to the holder node 360.

The controlling unit 530 of the holder node receives from the next node the response message REPLY.INFO including the address of the wired node to which the requested data (file) will be transmitted in operation S670, and then transmits the requested predetermined data to the wired node according to the address of the wired node included in the response message in operation S690.

Hereinafter, the operation of the wireless node according to an embodiment of the present invention will be described.

Figure 7:
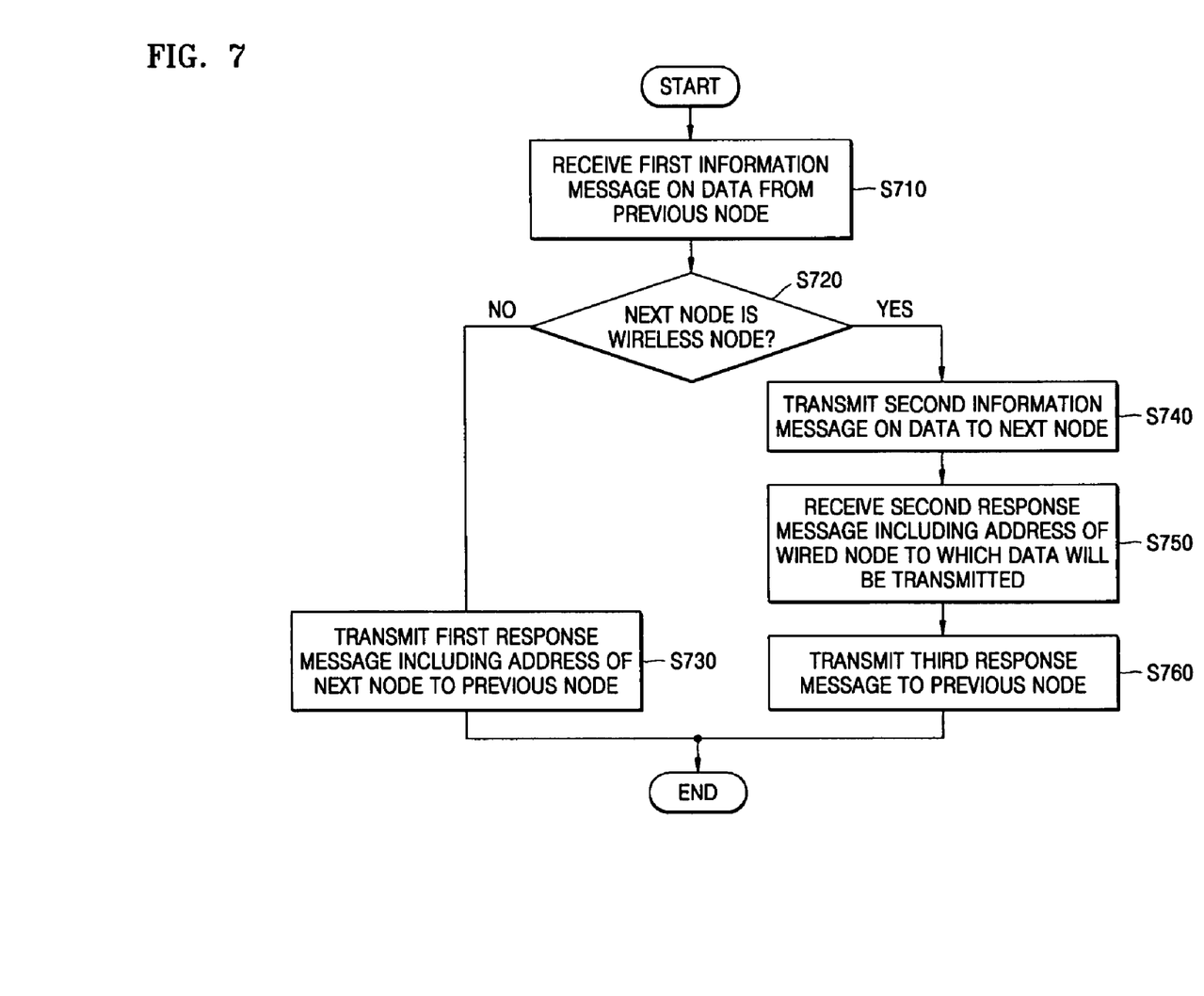
FIG. 7 is a flowchart illustrating the operation of a wireless node according to an embodiment of the present invention.

FIG. 7 is a flowchart illustrating the operation of a wireless node according to an embodiment of the present invention. Supposing, for example, that the node 350 shown in FIG. 3 is a wireless node according to an embodiment of the present invention and has the structure shown in FIG. 5, the operation of the node 350 will be described.

The node 350 receives the information message SEND.INFO from the holder node 360 through the communication unit 510 in operation S710. The controlling unit 530 which receives the information message SEND.INFO from the communication unit 510 caches the key value of the requested file and the address of the holder node 360 included in the message in the routing table. Then, the controlling unit 530 judges whether the next node 340 is a wired node or a wireless node by referring the routing table in operation S720. Based on the determination that the next node 340 is a wireless node, the controlling unit 530 generates the information message SEND.INFO and then transmits the message to the node 340 in operation S740. The node 340 transmits to the node 350 the response message REPLY.INFO including the address of the node 330, since the next node 330 is a wired node. The node 350 receives the response message REPLY.INFO from the node 340 in operation S750 and then generates the response message REPLY.INFO including the address of the wired node 330 and transmits it to the holder node 360 in operation S760.

If the next node 340 is a wired node, the controlling unit 530 of the node 350 generates the response message REPLY.INFO including the address of the wired node 340 and then transmits it to the holder node 360 (S730).

Figure 8:
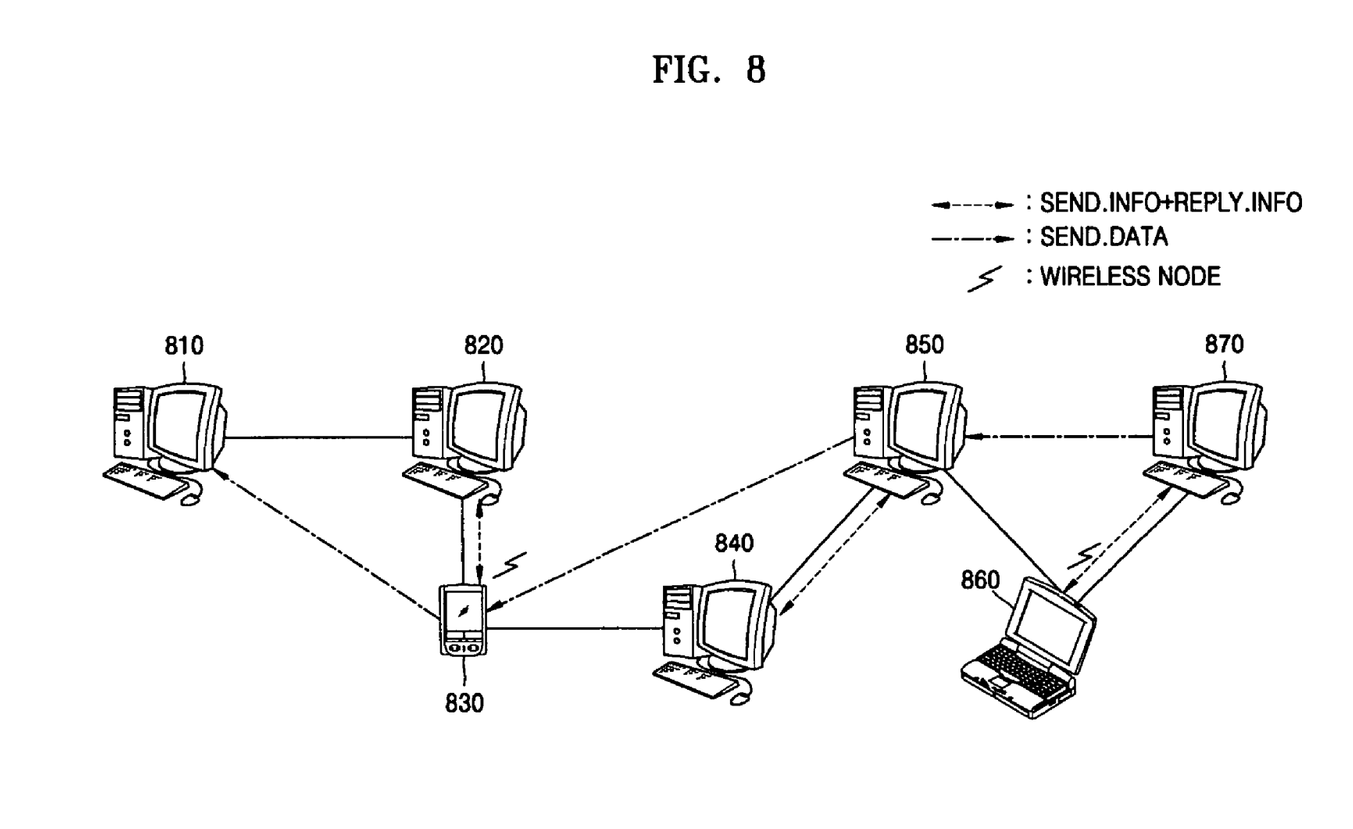
FIG. 8 illustrates a method of downloading data using the peer-to-peer service according to another embodiment of the present invention.

In the above-mentioned embodiments, the requested file was downloaded to the requester node only through the wired nodes located in the download path. Referring to FIG. 8, another embodiment of the present invention will be described. In this embodiment, the requested file is downloaded to the requester node only through nodes located at a predetermined interval, whether those nodes are wired nodes or wireless nodes.

A download path including a node 820, a node 830, a node 840, a node 850 and a node 860, in this order, is formed between a requester node 810 which wants to retrieve and download a specific file and a holder node 870 having the specific file. In the present embodiment, the requested file is transmitted to every other node in the download path. For example, the requested file is transmitted to the requester node 810 through the node 830 and the node 850. For this, the above-mentioned messages SEND.INFO and REPLY.INFO are exchanged between the holder node 870 and the node 860, between the node 840 and the node 850, and between the node 820 and the node 830. The node 820, the node 840 and the node 860 cache only the information on the requested file in their routing tables. In the present embodiment, the interval between the nodes in which the requested file is stored is 1. However, the interval may be at least two if necessary.

As mentioned above, the embodiments according to the present invention can be applied to downloading and caching data on a wired and wireless integrated network, and the network protocol is not limited. That is, the network may be based on internet protocol version 4, internet protocol version 6, or a combination thereof.

The method of downloading data according to aspects of the present invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. Aspects of the present invention may also be embodied as carrier waves (such as data transmission through the internet). The computer readable recording medium can also be distributed over network coupled computer systems so that the computer readable code is stored and executed in a distributed fashion.

As mentioned above, aspects of the present invention allow data to be rapidly downloaded through a wired and wireless integrated network using a peer-to-peer service, in consideration of the limited bandwidth of the wireless channel. Also, the data storage space of the node can be saved by not caching the downloaded file in wireless nodes or caching selectively in wired nodes. Accordingly, aspects of the present invention can increase the file download rate without reducing the file retrieval success ratio according to the peer-to-peer method, and can improve the load balance of the network.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of downloading data in a peer-to-peer service of a wired and wireless integrated network, comprising:
   downloading the data to a requester node only through wired nodes of a download path between the requester node which requests the data and a holder node which holds the data, the download path comprising a series of nodes through which the holder node downloads the data to the requester node and including both wired and wireless nodes;
   wherein the downloading of the data comprises:
      if a first node next to the holder node in the download path is a wireless node, the holder node transmitting a first information message including information on the data,
      if a second node next to the first node is a wired node, the first node transmitting a first response message including an address of the second node to the holder node, in response to the first information message, and
      the holder node transmitting the data to the second node, according to the first response message,
      if the second node is a wireless node, the first node transmitting a second information message including information on the data to the second node, and
      if a third node next to the second node is a wired node, the second node transmitting a second response message including an address of the third node to the holder node through the first node in response to the second information message, and the holder node transmitting the data to the third node according to the second response message.

2. The method according to claim 1, wherein the first information message includes a key value representing the data and information on the holder node in which the data is stored.

3. The method according to claim 1, wherein the first response message further includes a key value representing the data.

4. The method according to claim 1, wherein the downloading of the data to the requester node comprises storing the data in the wired nodes located in the download path.

5. The method according to claim 1, wherein the downloading of the data to the requester node comprises selectively storing the data in some of the wired nodes located in the download path.

6. The method according to claim 1, wherein the downloading of the data to the requester node comprises storing the data only in the wired nodes located at predetermined intervals among the wired nodes located in the download path.

7. A method of downloading data using a holder node which is connected to a wired and wireless integrated peer-to-peer network and has data requested by a requester node, comprising:
   judging whether a first node next to the holder node in a download path between the requester node and the holder node is a wired node or a wireless node, the download path comprising a series of nodes in the integrated peer-to-peer network through which the holder node downloads the data to the requester node and including both wired and wireless nodes;
   transmitting a first information message including information on the data to the first node when the first node in the download path is judged to be a wireless node;
   receiving from the first node a first response message including an address of a second node when the second node next to the first node is a wired node;
   receiving from the second node a second response message including an address of a third node when the second node is a wireless node and the third node next to the second node is a wired node;
   transmitting the data to the second node when the first response message is received; and
   transmitting the data to the third node when the second response message is received.

8. The method according to claim 7, wherein the first information message includes a key value representing the data and information on the holder node in which the data is stored.

9. The method according to claim 7, wherein the first response message further includes a key value representing the data.

10. The method according to claim 7, further comprising, if the first node is a wired node, transmitting the data to the first node.

11. A holder node which is connected to a wired and wireless integrated peer-to-peer network and has data requested by a requester node, comprising:
   a communication unit which performs communication with other nodes connected to the peer-to-peer network;
   a data storing unit which stores the data requested by the requester node; and
   a controlling unit which judges whether a first node next to the holder node is a wired node or a wireless node in a download path between the requester node and the holder node, the download path comprising a series of nodes through which the holder node downloads the data to the requester node and including both wired and wireless nodes, generates first information message including information on the data and controls the communication unit to transmit the information message to the first node if the first node is the wireless node, receives from the first node via the communication unit a first response message including an address of a second node next to the first node when the second node is a wired node, receives from the second node via the communication unit a second response message including an address of a third node next to the second node when the second node is a wireless node and the third node is a wired node; controls the communication unit to transmit the data to the second node when the first response message is received; and controls the communication unit to transmit the data to the third node when the second response message is received.

12. The holder node according to claim 11, wherein the first information message includes a key value representing the data and information on the holder node in which the data is stored.

13. The holder node according to claim 11, wherein the first response message further includes a key value representing the data.

14. The holder node according to claim 11, wherein the controlling unit controls the communication unit to transmit the data to the first node, if the first node is a wired node.

15. A method of downloading data using a wireless node which is connected to a wired and wireless integrated peer-to-peer network and is located in a download path between a requester node and a holder node which has the data requested by the requester node, comprising:

receiving a first information message including information on the data from a previous node;

judging whether a next node in the download path is a wired node or a wireless node;

transmitting a first response message including an address of the next node to the previous node when the next node is a wired node;

transmitting a second information message including the information on the data to the next node when the next node is a wireless node; and receiving from the next node a second response message including an address of a node located next to the next node and transmitting to the previous node a third response message including the address of the node located next to the next node, when the next node is a wireless node and the node located next to the next node is the wired node, wherein the download path comprises a series of nodes in the integrated peer-to-peer network through which the holder node downloads the data to the requester node and includes both wired and wireless nodes.

16. The method according to claim 15, wherein the first information message and the second information message include a key value representing the data and information on the holder node in which the data is stored.

17. The method according to claim 15, wherein the first through third response messages include a key value representing the data.

18. A wireless node which is connected to a wired and wireless integrated peer-to-peer network and is located in a download path between a requester node and a holder node which has data requested by the requester node, comprising:

a communication unit which receives a first information message including information on the data transmitted by a previous node through the peer-to-peer network; and a controlling unit which judges whether a next node in the download path is a wired node or a wireless node in response to the first information message, generates a first response message including an address of the next node and controls the communication unit to transmit the first response message to the previous node when the next node is judged to be a wired node, generates a second information message including information on the data and controls the communication unit to transmit the second information message to the next node when the next node is a wireless node, and controls the communication unit to receive from the next node a second response message including an address of a node located next to the next node and transmit to the previous node a third response message including the address of the node located next to the next node, when the next node is a wireless node and the node located next to the next node is the wired node;

wherein the download path comprises a series of nodes in the integrated peer-to-peer network through which the holder node downloads the data to the requester node and includes both wired and wireless nodes.

19. The wireless node according to claim 18, wherein the first information message and the second information message include a key value representing the data and information on the holder node in which the data is stored.

20. The wireless node according to claim 18, wherein the first through third response messages include a key value representing the data.

21. The wireless node according to claim 18, further comprising a data storing unit which stores information on the data included in the first information message.

22. A computer-readable medium having embodied thereon instructions that, when executed by a computer, cause the computer to execute a method of downloading data in a peer-to-peer service of a wired and wireless integrated network, the method of downloading data comprising:

downloading the data to a requester node only through wired nodes located in a download path between the requester node which requests the data and a holder node which has the data, the download path comprising a series of nodes through which the holder node downloads the data to the requester node and including both wired and wireless nodes;

wherein the downloading of the data comprises:

if a first node next to the holder node in the download path is a wireless node, the holder node transmitting a first information message including information on the data, if a second node next to the first node is a wired node, the first node transmitting a first response message including an address of the second node to the holder node, in response to the first information message, and the holder node transmitting the data to the second node, according to the first response message, if the second node is a wireless node, the first node transmitting a second information message including information on the data to the second node, and if a third node next to the second node is a wired node, the second node transmitting a second response message including an address of the third node to the holder node through the first node in response to the second information message, and the holder node transmitting the data to the third node according to the second response message.

23. A computer-readable medium having embodied thereon a instructions that, when executed by a computer, cause the computer to execute a method of downloading data using a holder node which is connected to a wired and wireless integrated peer-to-peer network and has data requested by a requester node, the method of downloading data comprising:

judging whether a first node next to the holder node in a download path between the requester node and the holder node is a wired node or a wireless node, the download path comprising a series of nodes in the integrated peer-to-peer network through which the holder node downloads the data to the requester node and including both wired and wireless nodes;

transmitting a first information message including information on the data to the first node when the first node in the download path is judged to be a wireless node;

receiving from the first node a first response message including an address of a second node when the second node next to the first node is a wired node;

receiving from the second node a second response message including an address of a third node when the second node is a wireless node and the third node next to the second node is a wired node;

transmitting the data to the second node when the first response message is received; and transmitting the data to the third node when the second response message is received .

24. A computer-readable medium having embodied thereon instructions that, when executed by a computer, cause the computer to execute a method of downloading data using a wireless node which is connected to a wired and wireless integrated peer-to-peer network and is located in a download path between a requester node and a holder node which has the data requested by the requester node, the method of downloading data comprising:

receiving a first information message including information on the data from a previous node;

judging whether a next node in the download path is a wired node or a wireless node;

transmitting a first response message including an address of the next node to the previous node when the next node is a wired node;

transmitting a second information message including the information on the data to the next node when the next node is a wireless node; and receiving from the next node a second response message including an address of a node located next to the next node and transmitting to the previous node a third response message including the address of the node located next to the next node, when the next node is a wireless node and the node located next to the next node is the wired node, wherein the download path comprises a series of nodes in the integrated peer-to-peer network through which the holder node downloads the data to the requester node and includes both wired and wireless nodes.

* * * * *

UNITED STATES PATENT AND TRADEMARK OFFICE
CERTIFICATE OF CORRECTION

| | |
|---|---|
| PATENT NO. | : 7,821,945 B2 |
| APPLICATION NO. | : 11/256162 |
| DATED | : October 26, 2010 |
| INVENTOR(S) | : Kyung-geun Lee et al. |

It is certified that error appears in the above-identified patent and that said Letters Patent is hereby corrected as shown below:

Column 11, Line 4, In Claim 11, after "generates" insert --a--.

Column 13, Line 31, In Claim 23, delete "received ." and insert --received.--, therefor.

Signed and Sealed this
Nineteenth Day of April, 2011

David J. Kappos
*Director of the United States Patent and Trademark Office*